United States Patent [19]
Kitagawa

[11] Patent Number: 4,644,916
[45] Date of Patent: Feb. 24, 1987

[54] V-TYPE FOUR STROKE ENGINE WITH COUNTER ROTATING BALANCE WEIGHTS CANCELING OUT FIRST ORDER IMBALANCE MOMENTS OF RECIPROCATING AND OF ROTATIONAL MOTION

[75] Inventor: Katsutoshi Kitagawa, Toyota, Japan

[73] Assignee: Toyota Jidosha Kabushiki Kaisha, Japan

[21] Appl. No.: 755,821

[22] Filed: Jul. 17, 1985

[30] Foreign Application Priority Data

Aug. 2, 1984 [JP] Japan ................................ 59-163197

[51] Int. Cl.[4] ............................................ F16F 15/26

[52] U.S. Cl. ............................ 123/192 B; 123/90.31; 74/603

[58] Field of Search .......... 123/192 R, 192 B, 55 VE, 123/55 VS, 90.27, 90.31; 74/603, 604

[56] References Cited

U.S. PATENT DOCUMENTS 4,305,352 12/1981 Oshima et al. ................... 123/90.31
4,351,202 9/1982 Summers ............................... 74/604
4,552,104 11/1985 Hara et al. ...................... 123/192 R
4,553,473 11/1985 Ichida et al. ..................... 123/90.31

FOREIGN PATENT DOCUMENTS 2341082 2/1974 Fed. Rep. of Germany ........ 123/55 VE
0819193 10/1937 France ................................ 74/604
0065745 5/1980 Japan .................................... 74/604
0521767 9/1979 U.S.S.R. .......................... 123/192 B

*Primary Examiner*—Willis R. Wolfe, Jr.
*Attorney, Agent, or Firm*—Parkhurst & Oliff

[57] ABSTRACT

This four stroke V-configuration engine has two cylinder banks which have equal numbers of cylinders, angled with respect to one another at a bank angle $\alpha$ different from 90°. For each bank of cylinders, the angular positions of the crank shaft crank pins therefor are evenly spaced apart around the central axis of the crank shaft, and between the banks of cylinders the angular positions of a pair of corresponding cylinders are separated by a crank angle of $90°-\alpha$. A first set of balance weights is provided so as to rotate about an axis parallel to the rotational axis of the crank shaft in the same direction and at the same speed as the crank shaft, and a second set of balance weights is provided so as to rotate about an axis parallel to the rotational axis of the crank shaft in the opposite direction and at the same speed as the crank shaft. The positions and the weights of the first and second sets of balance weights are such as to cancel out the first order imbalance moments of reciprocating and of rotational motion.

3 Claims, 11 Drawing Figures

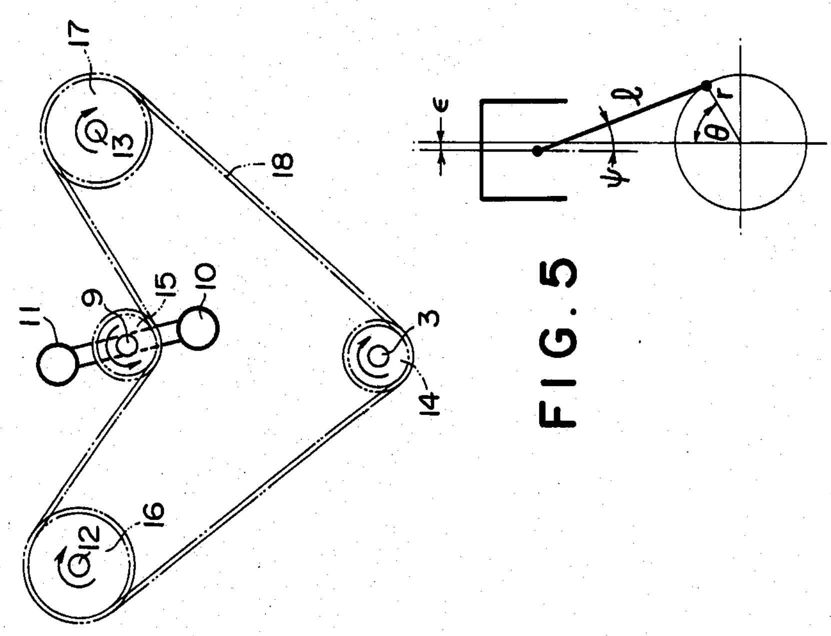
FIG. 4
FIG. 5
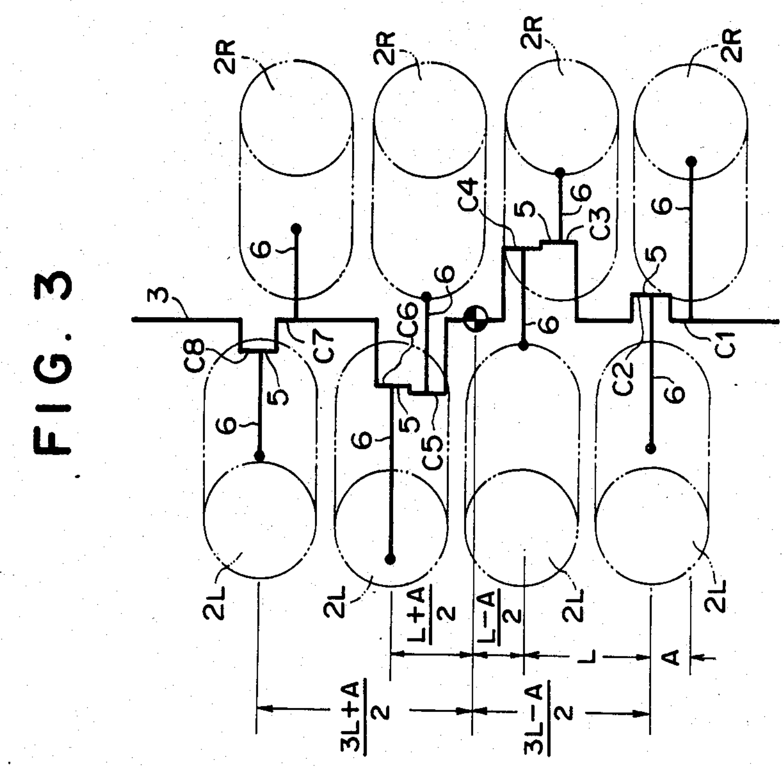
FIG. 3

V-TYPE FOUR STROKE ENGINE WITH COUNTER ROTATING BALANCE WEIGHTS CANCELING OUT FIRST ORDER IMBALANCE MOMENTS OF RECIPROCATING AND OF ROTATIONAL MOTION

BACKGROUND OF THE INVENTION

The present invention relates to a V-type four stroke engine, and in particular to a V-type four stroke engine which has a bank angle which is other than 90°.

In the four stroke multi cylinder internal combustion engine art, it is per se known to so configure the cylinders and the crank as to make the firing of the cylinders evenly spaced with respect to crank angle, and to keep the low order components of the torque fluctuation low. For this even firing, in a V8 engine in which the crankpins are formed as double crankpins each of which serves for two cylinders, it is required for the bank angle between the cylinder banks to be 90°; and, on the other hand, in a V8 engine in which the bank angle is not 90°, it is required to arrange the inter-bank angle between corresponding crank pins to be equal to (90°−the bank angle). For further information on this matter, reference should be made to the issue of the journal Jidoosha Koogaku Benran dated 1 Dec. 1976, or to U.S. Pat. Nos. 3,308,680 and 3,978,828.

In such a case as that outlined above, i.e. in a V8 engine in which the bank angle is not 90° and the inter-bank angle between corresponding crank pins is equal to (90°−the bank angle), the cylinders fire evenly although the bank angle is not 90°; but, as compared with the 90° case, the unbalanced moment due to reciprocating and rotating parts is increased, and vibration is increased. Therefore in practice at the present time, due to this problem, the four stroke non 90° V8 engine is not used for automobiles. And similar considerations apply to a V6 type engine. Yet, the provision of such a non 90° V type engine would be very convenient in terms of mounting convenience in a modern type vehicle; in particular, it would be very desirable to reduce the bank angle of a V8 type engine to be less than 90°, in view of the evident desirability of reducing the total width of the engine. Such considerations are becoming more and more important nowadays, in view of the ever increasing requirements for reducing the exterior size of the vehicle and accordingly for restricting the size of the vehicle engine room.

SUMMARY OF THE INVENTION

Accordingly, it is the primary object of the present invention to provide a four stroke V configuration engine which avoids the above outlined problem.

It is a further object of the present invention to provide such a four stroke V configuration engine, the bank angle of which can be chosen as desired and particularly can be greater or less than 90° in the case of an eight cylinder engine, which is substantially free from vibration problems.

It is a further object of the present invention to provide such a four stroke V configuration engine which has good compensation and balance of the unbalanced moments due to reciprocating and rotating parts.

It is a further object of the present invention to provide such a four stroke V configuration engine which has excellent mounting convenience.

It is a further object of the present invention to provide such a four stroke V configuration engine which is compact.

It is a further object of the present invention to provide such a four stroke V configuration engine which is reduced in width as compared to conventional art.

It is a yet further object of the present invention to provide such a four stroke V configuration engine which has eight cylinders.

It is a yet further object of the present invention to provide such a four stroke V configuration engine which has six cylinders.

According to the most general aspect of the present invention, these and other objects are accomplished by a four stroke V configuration engine with exactly two cylinder banks which have equal numbers of cylinders, angled with respect to one another at a bank angle $\alpha$ different from 90°, and comprising a crank shaft which is formed with one crank pin for each said cylinder, wherein: for each said bank of cylinders, the angular positions of the crank pins therefor are evenly spaced apart around the central axis of said crank shaft; and between said banks of cylinders, the angular positions of a pair of corresponding cylinders are separated by a cranks angle of $90°-\alpha$; further comprising: a first set of balance weights provided so as to rotate about an axis parallel to the rotational axis of said crank shaft in the same direction and at the same speed as said crank shaft; and a second set of balance weights provided so as to rotate about an axis parallel to the rotational axis of said crank shaft in the opposite direction and at the same speed as said crank shaft; wherein the positions and the weights of said first and second sets of balance weights are such as to cancel out the first order imbalance moments of reciprocating and of rotational motion.

According to such a structure, the above outlined problems with respect to the prior art can be overcome simply and economically, and there can be provided a four stroke V configuration engine, the bank angle of which can be arbitrarily chosen as desired and particularly can be greater or less than 90° in the case of an eight cylinder engine; and this engine is substantially free from vibration problems, because it has good compensation and balance of the unbalanced moments due to reciprocating and rotating parts. Thus, this four stroke V configuration engine has excellent mounting convenience, and is compact and particularly is reduced in width as compared to conventional art.

According to particular specializations of the inventive concept of the present invention, this four stroke V configuration engine may have eight cylinders with each cylinder bank having four cylinders, or alternatively may have six cylinders with each cylinder bank having three cylinders. And the first set of balance weights may be attached to the crank shaft; and the engine may further comprise a balance shaft, extending parallel to said crank shaft, to which the second set of balance weights is attached; and in this case the balance shaft may be provided generally between the two cylinder banks.

BRIEF DESCRIPTION OF THE DRAWINGS

The present invention will now be shown and described with reference to the preferred embodiments thereof, and with reference to the illustrative drawings. It should be clearly understood, however, that the description of the embodiments, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings, like parts and spaces and so on are denoted by like reference symbols in the various figures thereof; in the description, spatial terms are to be everywhere understood in terms of the relevant figure; and:

FIG. 3 is a plan view of said essential components of said V8 engine;

FIG. 4 is a diagrammatic end on view showing an endless drive chain which drives two overhead cam shafts and a balance shaft from a crank shaft of said V8 engine;

FIG. 5 is a schematic diagram for defining the piston and crank assembly structural dimensions;

DESCRIPTION OF THE PREFERRED EMBODIMENTS

Figure 2:
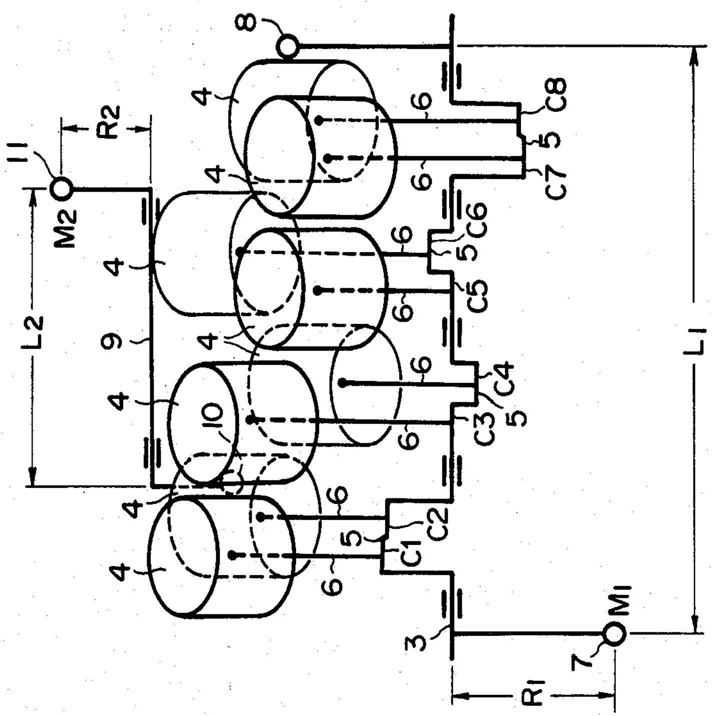
FIG. 2 is a schematic side view of said essential components of said V8 engine.
Figure 1:
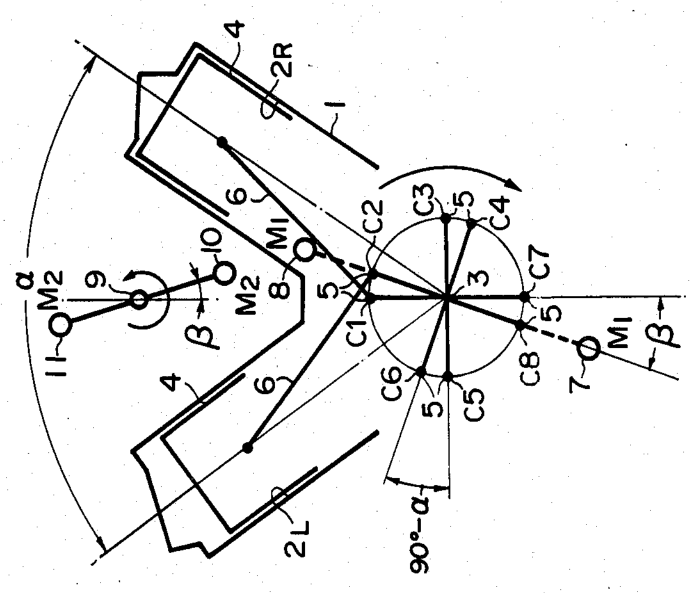
FIG. 1 is a schematic end on diagram showing the essential components of a V8 engine which is the first preferred embodiment of the present invention.

The present invention will now be described with reference to the preferred embodiments thereof, and with reference to the appended drawings. FIGS. 1 through 7 relate to the first preferred embodiment, which is a V8 engine, and FIGS. 1 through 5 illustrate different views thereon in schematic form: FIG. 1 is an end on view of this V8 engine, while FIG. 2 is a side view thereof and FIG. 3 is a plan view. In these figures, the reference numeral 1 denotes the cylinder block, while four left cylinder bores 2L and four right cylinder bores 2R (only one of each of which is visible in FIG. 1) are bored in this cylinder block 1. The central axes of the four left cylinder bores 2L are coplanar, as are the central axes of the four right cylinder bores 2R; and the plane thus defined by said left cylinder bores 2L and the plane thus defined by said right cylinder bores 2R (which hereinafter will be referred to as the cylinder bore planes) meet at a bank angle of $\alpha$ which is not equal to 90°; in fact, in the illustrated first preferred embodiment, this bank angle $\alpha$ is equal to about 70°.

A crank shaft 3 is mounted in the cylinder block 2 so as to be rotatable about its central axis which lies along the meeting line of the two above defined cylinder bore planes. This crank shaft 3 is formed with eight crank pins 5, which are individually designated by the reference symbols C1 through C8 in the figures, and these crank pins 5 are not formed in pairs but are mutually angularly spaced apart as illustrated in FIG. 1. To each of these crank pins is rotationally connected the big end portion of a connecting rod 6, and the small end portion of each of these connecting rods 6 is rotationally connected by a piston pin which is not particularly shown to a corresponding piston 4 which slides in one of the cylinder bores 2L or 2R: in fact, the crank pins designated as "C" with an odd numeral are the ones which are connected to those of the pistons 4 which slide in the right side cylinder bores 2R, and these odd numbered crank pins are mutually angularly spaced apart by 90°, while the crank pins designated as "C" with an even numeral are the ones which are connected to those of the pistons 4 which slide in the left side cylinder bores 2L, and these even numbered crank pins are similarly mutually angularly spaced apart by 90°. Thus, the two crank pins of each of the pairs of crank pins for a pair of corresponding cylinders (i.e., the crank pin pairs C1 and C2, C3 and C4, C5 and C6, and C7 and C8) are mutually angularly spaced apart by an angle equal to $(90° - \alpha)$, which in this illustrated first preferred embodiment is equal to about 20°. And the firing order for the thus arranged eight cylinders is every 90° of crank angle, i.e., in order, cylinders 1—8—4—3—6—5—7—2. This gives evenly spaced firing.

With this crank pin arrangement and this firing order, the first order and the second order components of the inertia force of the rotatory portion of the parts are in balance, but the first order component of the moment due to the inertia of the reciprocating parts does not balance.

Therefore, according to the present invention, there are provided balance weights 7 and 8 formed integrally with the crank shaft 3, and there is also provided a balance shaft 9 rotatably mounted in the engine block 1 parallel to the central axis of the crank shaft 3, said balance shaft 9 having balance weights 10 and 11 integrally mounted on it. In the shown first preferred embodiment, the balance shaft 9 is provided in the V-shape defined between the left and right cylinder banks, so that it does not cause great inconvenience as regards space utilization and does not greatly increase the volume of the engine. And this balance shaft 9 is driven by the arrangement shown in FIG. 4 at the same rotational speed as the crank shaft 3 and in the opposite rotational direction. Referring to this figure, the reference numerals 12 and 13 respectively denote left and right cam shafts for the left and right cylinder banks (this engine is an overhead cam shaft type engine), while 14, 15, 16, and 17 are sprocket wheels fixedly mounted on, respectively, the crank shaft 3, the balance shaft 9, the left cylinder bank cam shaft 12, and the right cylinder bank camshaft 13. The sprocket wheels 14 and 15 on the crank shaft 3 and the balance shaft 9 are of the same diameter, thus ensuring that the rotational speed of the balance shaft 9 is the same as that of the crank shaft 3, while the sprocket wheels 16 and 17 on the left and right cam shafts 12 and 13 are of double that diameter, thus ensuring that the rotational speed of said cam shafts 12 and 13 is half that of the crank shaft 3, as of course is appropriate. And an endless chain 18 is fitted around these sprocket wheels 14, 15, 16, and 17, as shown in the figure, and passes around the outsides of the sprocket wheels 14, 16, and 17 respectively on the crank shaft 3 and the left and right cam shafts 12 and 13, thus ensuring that said left and right cam shafts 12 and 13 rotate in the same rotational direction (clockwise in the figure) as said crank shaft 3 as is appropriate, while on the other hand said endless chain 18 passes around the inside of the sprocket wheel 15 on the balance shaft 9, thus ensuring that said balance shaft 9 rotates in the opposite rotational direction (counterclockwise in the figure) to said crank shaft 3.

Now (see FIG. 2) the characteristics of the balance weights 7 and 8 on the crank shaft 3 are that they have equal masses M1, are separated by a distance L1 as measured along the axis of the crank shaft 3, and are offset from said axis of said crank shaft 3 by equal radiuses R1. These must satisfy the following condition:

$$M_1 \cdot R_1 \cdot L_1 = \frac{W}{g} r L \sqrt{5(1 + \sin\alpha)(q1^2 + p1^2)}$$

where:

- W is the weight of the reciprocating motion portion
- g is the acceleration due to gravity
- L is the cylinder spacing
- $\alpha$ is the bank angle
- q1 is the acceleration Fourier series cosine first order coefficient, i.e. q1=1 and

- p1 is the acceleration Fourier series sine first order coefficient, $$\text{i.e.: } p1 = -\frac{\epsilon}{l}\left\{\left(1 + \frac{\epsilon^2}{2l^2} + \frac{3\epsilon^2}{8l^4} + \ldots\right) + \frac{6}{8\lambda^2}\left(1 + \frac{5\epsilon^2}{2l^2} + \ldots\right) + \ldots\right\}$$

Further, (again see FIG. 2) the characteristics of the balance weights 10 and 11 on the balance shaft 9 are that they have equal masses M2, are separated by a distance L2 as measured along the axis of the balance shaft 9, and are offset from said axis of said balance shaft 9 by equal radiuses R2. These must satisfy the following condition:

$$M_2 \cdot R_2 \cdot L_2 = \frac{W}{g} r L \sqrt{5(1 - \sin\alpha)(q1^2 + p1^2)}$$

And the direction of offset of the balance weights 7 and 8 on the crank shaft 3 is as shown in FIG. 1; i.e., when the crank shaft 3 is in its initial position with the crank pin C1 for the cylinder 1 located perpendicularly above the central axis of the crank shaft 3 (and with the plane including said crank pin C1 and said central axis thus bisecting the bank angle between the aforementioned planes including the axes of the left and the right cylinders), then the line of the balance weights 7 and 8 makes an angle $\beta$ with the vertical, where:

$$\beta = 45^\circ - \frac{\alpha}{2} + \tan^{-1}\tfrac{1}{3} = \tan^{-1}\frac{p1}{q1}$$

Further, the direction of offset of the balance weights 10 and 11 on the balance shaft 9 is the same angle, but opposite, as also can be seen in FIG. 1.

By providing the balance weights thus, the first order moment of the rotation of the crank shaft 3 due to the inertia of the reciprocating motion component is balanced. But the crank shaft 3 is asymmetrical, looking in its axial direction, so that so far the moment produced by the inertia of the rotary motion is not balanced. This problem, however, is solved by adding further balance weights to the crankshaft of suitable weight and phase, in addition to the balance weights 7 and 8.

Next, the dynamics of the crank construction and balance for this first preferred embodiment V8 engine will be discussed, with reference to FIGS. 5 through 7.

FIG. 5 is a schematic diagram for defining the piston and crank assembly structural dimensions. As shown in this figure, r is the crank radius, l is the length of the connecting rod between the central axes of the big end and the small end thereof, $\lambda$ is l/r or the connecting rod ratio, $\theta$ is the crank rotation angle, $\psi$ is the piston splay angle, and $\epsilon$ is the piston pin offset. With these quantities as thus defined, the piston stroke $\chi$ is determined by the following equation:

$$\chi = (r+l)\cos\gamma - r\cos\theta - l\cos\psi \tag{1}$$

$$\gamma = \sin + \{\epsilon/(l+r)\}$$

And, as is clear from FIG. 5, $$r\sin\theta = l\sin\psi - \epsilon \tag{2}$$

and from some elementary trigonometrical theorems, $$\cos\psi = \sqrt{1 - \sin^2\psi} \tag{3}$$

Substituting (3) in (2), and remembering that $\epsilon/l$ and $1/\lambda = r/l$ are both less than unity, and by doing the Fourier expansion:

$$\begin{aligned}
\cos\phi = &\left\{\left(1 - \frac{\epsilon^2}{2l^2} - \frac{\epsilon^4}{8l^4} - \frac{\epsilon^6}{16l^6} - \ldots\right) - \frac{1}{4\lambda^2}\left(1 + \frac{3\epsilon^2}{2l^2} + \frac{15\epsilon^4}{8l^4} + \ldots\right) - \frac{3}{64\lambda^4}\left(1 + \frac{15\epsilon^2}{2l^2} + \ldots\right) - \ldots\right\} - \\
&\left\{\left(1 + \frac{\epsilon^2}{2l^2} + \frac{3\epsilon^4}{8l^4} + \ldots\right) + \frac{6}{8\lambda^2}\left(1 + \frac{5\epsilon^2}{2l^2} + \ldots\right) + \ldots\right\}\frac{\epsilon}{\lambda l}\sin\theta + \\
&\left\{\left(1 + \frac{3\epsilon^2}{2l^2} + \frac{15\epsilon^4}{8l^4} + \ldots\right) + \frac{1}{4\lambda^2}\left(1 + \frac{15\epsilon^2}{2l^2} + \ldots\right) + \ldots\right\}\frac{1}{4\lambda^2}\cos 2\theta + \\
&\left\{\left(1 + \frac{5\epsilon^2}{2l^2} + \ldots\right) + \ldots\right\}\frac{\epsilon}{8\lambda^3 l}\sin 3\theta - \\
&\left\{\left(1 + \frac{15\epsilon^2}{2l^2} + \ldots\right) + \ldots\right\}\frac{1}{64\lambda^4}\cos 4\theta + \ldots
\end{aligned} \tag{4}$$

We can derive the piston acceleration $\alpha(\theta)$ by differentiating $\chi$ with respect to time twice:

$$\alpha(\theta) = d^2\chi/dt^2 = -r\frac{d^2}{dt^2}(\cos\theta + \lambda\cos\phi) =$$

$$r\omega^2\left(\cos\theta - \frac{\epsilon}{l}\sin\theta\left\{\left(\left(1 + \frac{\epsilon^2}{2l^2} + \frac{3\epsilon^4}{8l^4} + \dots\right) + \frac{6}{8\lambda^2}\left(1 + \frac{5\epsilon^2}{2l^2} + \dots\right) + \dots\right\} + \frac{1}{\lambda}\cos 2\theta\left\{\left(\left(1 + \frac{3\epsilon^2}{2l^2} + \frac{15\epsilon^4}{8l^4} + \dots\right) + \frac{1}{4\lambda^2}\left(1 + \frac{15\epsilon^2}{2l^2} + \dots\right) + \dots\right\} + \frac{9\epsilon}{8\lambda^2 l}\sin 3\theta\left\{\left(\left(1 + \frac{5\epsilon^2}{2l^2} + \dots\right) + \dots\right\} - \frac{1}{4\lambda^3}\cos 4\theta\left\{\left(\left(1 + \frac{15\epsilon^2}{2l^2} + \dots\right) + \dots\right\} + \dots\right)$$

which for convenience can be written as:

$$\alpha(\theta) = r\omega^2\left(\sum_n qn\cos n\theta + \sum_m pm\sin m\theta\right) \quad (5)$$

where $n=1, 2, 4 \dots$ $m=1, 3, \dots$

Figure 6:
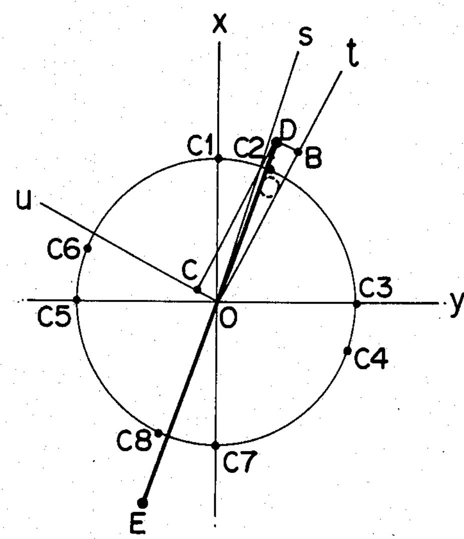
FIG. 6 schematically shows the size and phase of the balance weights on the crank shaft, in this first preferred embodiment.
Figure 7:
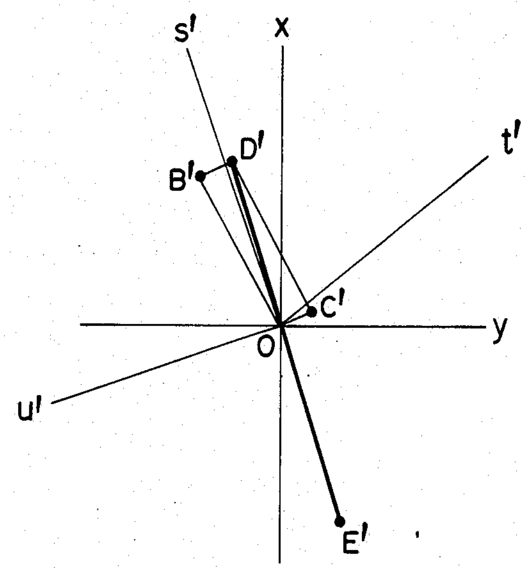
FIG. 7 similarly shows the size and phase of the balance weights on the balance shaft.

Now, in FIGS. 6 and 7, this is diagrammed on the complex plane, with the x axis real and the y axis imaginary. Thus, the inertia of the reciprocating motion of each cylinder can be considered as a vector.

If the reciprocating motion weight is W, then the inertia for each cylinder is as follows:

$$\text{Inertia of cylinder 1} = \frac{W}{g}\alpha\left(\theta - \frac{\alpha}{2}\right)e^{i\frac{\alpha}{2}}$$

$$\text{Inertia of cylinder 2} = \frac{W}{g}\alpha\left(\theta - \frac{\alpha}{2} + 90^\circ\right)e^{-i\frac{\alpha}{2}}$$

$$\text{Inertia of cylinder 3} = \frac{W}{g}\alpha\left(\theta - \frac{\alpha}{2} + 90^\circ\right)e^{i\frac{\alpha}{2}}$$

$$\text{Inertia of cylinder 4} = \frac{W}{g}\alpha\left(\theta - \frac{\alpha}{2} + 180^\circ\right)e^{-\frac{\alpha}{2}}$$

$$\text{Inertia of cylinder 5} = \frac{W}{g}\alpha\left(\theta - \frac{\alpha}{2} - 90^\circ\right)e^{i\frac{\alpha}{2}}$$

$$\text{Inertia of cylinder 6} = \frac{W}{g}\alpha\left(\theta - \frac{\alpha}{2}\right)e^{-i\frac{\alpha}{2}}$$

$$\text{Inertia of cylinder 7} = \frac{W}{g}\alpha\left(\theta - \frac{\alpha}{2} + 180^\circ\right)e^{i\frac{\alpha}{2}}$$

-continued $$\text{Inertia of cylinder 8} = \frac{W}{g}\alpha\left(\theta - \frac{\alpha}{2} - 90^\circ\right)e^{-i\frac{\alpha}{2}}$$

The resultant F of these is obtained by the sum:

$$F = 2\frac{W}{g}\cos\frac{\alpha}{2}\left\{\alpha\left(\theta - \frac{\alpha}{2}\right) + \alpha\left(\theta - \frac{\alpha}{2} + 90^\circ\right) + \alpha\left(\theta - \frac{\alpha}{2} + 180^\circ\right) + \left(\theta - \frac{\alpha}{2} - 90^\circ\right)\right\} \quad (6)$$

$$\cos\left(\theta - \frac{\alpha}{2}\right) + \cos\left(\theta - \frac{\alpha}{2} + 90^\circ\right) + \cos\left(\theta - \frac{\alpha}{2} + 180^\circ\right) + \cos\left(\theta - \frac{\alpha}{2} - 90^\circ\right) \equiv 0$$

$$\cos 2\left(\theta - \frac{\alpha}{2}\right) + \cos 2\left(\theta - \frac{\alpha}{2} + 90^\circ\right) + \cos 2\left(\theta - \frac{\alpha}{2} + 180^\circ\right) + \cos 2\left(\theta - \frac{\alpha}{2} - 90^\circ\right) \equiv 0$$

$$\cos 4\left(\theta - \frac{\alpha}{2}\right) + \cos 4\left(\theta - \frac{\alpha}{2} + 90^\circ\right) + \cos 4\left(\theta - \frac{\alpha}{2} + 180^\circ\right) + \cos 4\left(\theta - \frac{\alpha}{2} - 90^\circ\right) = 4\cos 4\left(\theta - \frac{\alpha}{2}\right)$$

$$\sin\left(\theta - \frac{\alpha}{2}\right) + \sin\left(\theta - \frac{\alpha}{2} + 90^\circ\right) + \sin\left(\theta - \frac{\alpha}{2} + 180^\circ\right) + \sin\left(\theta - \frac{\alpha}{2} - 90^\circ\right) \equiv 0$$

$$\sin 3\left(\theta - \frac{\alpha}{2}\right) + \sin 3\left(\theta - \frac{\alpha}{2} + 90^\circ\right) + \sin 3\left(\theta - \frac{\alpha}{2} + 180^\circ\right) + \sin 3\left(\theta - \frac{\alpha}{2} - 90^\circ\right) \equiv 0$$

Therefore, the first, second, and third order items are zero, and the resultant of the inertia is as follows:

$$F = 8q_4(w/g)r\omega_2\cos(\alpha/2)\cdot\cos 4(\theta - (\alpha/2)) + \quad (7)$$

Next, the moment of inertia M of the reciprocating motion component about the engine center is obtained from the sum of inertia for each cylinder multiplied by the distance from the center of that cylinder bore to the center of the engine:

$$M = \frac{W}{g}\left[ e^{i\frac{\alpha}{2}}\left\{ \alpha\left(\theta - \frac{\alpha}{2}\right) \frac{3L + A}{2} + \alpha\left(\theta - \frac{\alpha}{2} + 90^\circ\right) \frac{L + A}{2} - \alpha\left(\theta - \frac{\alpha}{2} - 90^\circ\right) \frac{L - A}{2} - \alpha\left(\theta - \frac{\alpha}{2} + 180^\circ\right) \frac{3L - A}{2} \right\} + e^{-i\frac{\alpha}{2}}\left\{ \alpha\left(\theta - \frac{\alpha}{2} + 90^\circ\right) \frac{3L - A}{2} + \alpha\left(\theta - \frac{\alpha}{2} + 180^\circ\right) \frac{L - A}{2} - \alpha\left(\theta - \frac{\alpha}{2}\right) \frac{L + A}{2} - \alpha\left(\theta - \frac{\alpha}{2} - 90^\circ\right) \frac{3L + A}{2} \right\}\right] \tag{8}$$

Substituting (5) in (8), and simplifying:

$$M = \frac{W}{g} r\omega^2 \left[ Lq1\, e^{i\frac{\alpha}{2}}\left\{ 3\cos\left(\theta - \frac{\alpha}{2}\right) - \sin\left(\theta - \frac{\alpha}{2}\right)\right\} - Lq1\, e^{-i\frac{\alpha}{2}}\left\{ 3\sin\left(\theta - \frac{\alpha}{2}\right) + \cos\left(\theta - \frac{\alpha}{2}\right)\right\} + Lp1\, e^{i\frac{\alpha}{2}}\left\{ 3\sin\left(\theta - \frac{\alpha}{2}\right) + \cos\left(\theta - \frac{\alpha}{2}\right)\right\} + Lp1\, e^{-i\frac{\alpha}{2}}\left\{ 3\cos\left(\theta - \frac{\alpha}{2}\right) - \sin\left(\theta - \frac{\alpha}{2}\right)\right\} + q2\cos 2\left(\theta - \frac{\alpha}{2}\right)\cdot O + Lp3\, e^{i\frac{\alpha}{2}}\left\{ 3\sin 3\left(\theta - \frac{\alpha}{2}\right) - \cos 3\left(\theta - \frac{\alpha}{2}\right)\right\} - Lp3\, e^{-i\frac{\alpha}{2}}\left\{ 3\cos 3\left(\theta - \frac{\alpha}{2}\right) + \sin 3\left(\theta - \frac{\alpha}{2}\right)\right\} + 4\, iAq4 \sin\frac{\alpha}{2}\cos 4\left(\theta - \frac{\alpha}{2}\right) + \ldots \right] \tag{9}$$

In the resultant inertia F and the resultant moment M, the third and subsequent terms are small, and if they are not balanced, no practical problem arises. So F is effectively zero, and for M only the first term of (9) is a problem. This may be rewritten as:

$$\frac{W}{g} r\omega^2 Lq1\left\{ e^{i\left(\theta - \frac{\alpha}{2}\right)} \frac{3 + i}{2}\left(e^{i\frac{\alpha}{2}} + ie^{-i\frac{\alpha}{2}}\right) + e^{-i\left(\theta - \frac{\alpha}{2}\right)} \frac{3 - i}{2}\left(e^{i\frac{\alpha}{2}} - ie^{-i\frac{\alpha}{2}}\right)\right\} + \frac{W}{g} r\omega^2 Lp1\left\{ e^{i\left(\theta - \frac{\alpha}{2}\right)} \frac{3 + i}{2}\left(-ie^{i\frac{\alpha}{2}} + e^{-i\frac{\alpha}{2}}\right) + e^{-i\left(\theta - \frac{\alpha}{2}\right)} \frac{3i + 1}{2}\left(e^{i\frac{\alpha}{2}} - ie^{-i\frac{\alpha}{2}}\right)\right\} \tag{10}$$

In (10), $e^{i\theta}$ is the rotary velocity vector in the same direction as the crank shaft rotation, and is equal to the crank shaft rotary velocity; $e^{-i\theta}$ is the same magnitude rotation in the opposite direction.

So, by adding balance weights of weight and phase determined by the expression below to the crankshaft or to a member rotating in the same direction with the same rotational speed, the items involving $e^{i\theta}$ in (10) can be made zero.

$$-\frac{W}{g} rL \frac{3 + i}{2}\{q1(1 + ie^{-i\alpha}) + p1(-i + e^{-i\alpha})\} = -\frac{W}{g} rL \frac{3 + i}{2}(1 + ie^{-i\alpha})(q1 - ip1) = -\frac{W}{g} rL \sqrt{10(q_1^2 + P_1^2)} \cos\left(45^\circ - \frac{\alpha}{2}\right) e^{i\left(45^\circ - \frac{\alpha}{2} + \tan^{-1}\frac{1}{3} - \tan^{-1}\frac{P_1}{q_1}\right)} \tag{11}$$

Then, by adding balance weights of weight and phase determined by the expression below to a member rotating in the opposite direction and at the same rotational speed as the crankshaft (for example, to the balance shaft 9), the items involving $e^{-i\theta}$ in (10) can be made zero.

$$-\frac{W}{g} rL\left\{ q1 \frac{3 + i}{2}(e^{i\alpha} - i) + p1 \frac{3i + 1}{2}(e^{i\alpha} - i)\right\} = -\frac{W}{g} rL \frac{3 - i}{2}(e^{i\alpha} - i)(q1 + ip1) = -\frac{W}{g} rL \sqrt{10(q_1^2 + P_1^2)} \cos\left(45^\circ - \frac{\alpha}{2}\right) e^{-i\left(45^\circ - \frac{\alpha}{2} + \tan^{-1}\frac{1}{3} - \tan^{-1}\frac{P_1}{q^1}\right)} \tag{12}$$

Since the balance shaft 9 is only provided for its moment effect, it may be fitted anywhere on the engine block 1, provided that its central axis is disposed substantially parallel to the central axis of the crank shaft 3.

FIG. 6 shows the size and phase of the balance weights on the crank shaft 3, and:

$\angle \times Os = \tan^{-1}\frac{1}{3}$, $\angle sOt = \frac{1}{2}(90° - \alpha)$, $\angle uOt = 90°$, $\overline{BO} = q_1$, $$\overline{CO} = p_1,\ \angle DOB = \tan^{-1}\frac{p_1}{q_1},\ \overline{OE} = \frac{W}{g}\cdot$$

$$\frac{rL}{2}\,|(3 + i)(1 + ie^{i\alpha})(q_1 - ip_1)| = \frac{W}{g}\,rL\sqrt{5(1 + \sin\alpha)(q_1^2 + p_1^2)}\,,\ \angle DO$$

$E = 180°$

FIG. 7 shows the same for the balance shaft 9, and:

$\angle \times Os' = \tan^{-1}\frac{1}{3}$, $\angle s'Ot' = \alpha$, $\angle s'Ou' = 90°$, $\angle t'OB' =$ $$\frac{90 + \alpha}{2},\ \overline{B'O} = q_1,\ \overline{C'O} = p_1,\ \angle B'OD' = \tan^{-1}\frac{p_1}{q_1},$$

$$\overline{OE'} = \frac{W}{g}\cdot\frac{rL}{2}\,|(e^{i\alpha} - i)(3 - i)(q_1 + ip_1)| = \frac{W}{g}\,rL\sqrt{5(1 - \sin\alpha)(q_1^2 + p_1^2)}$$

Figure 8:
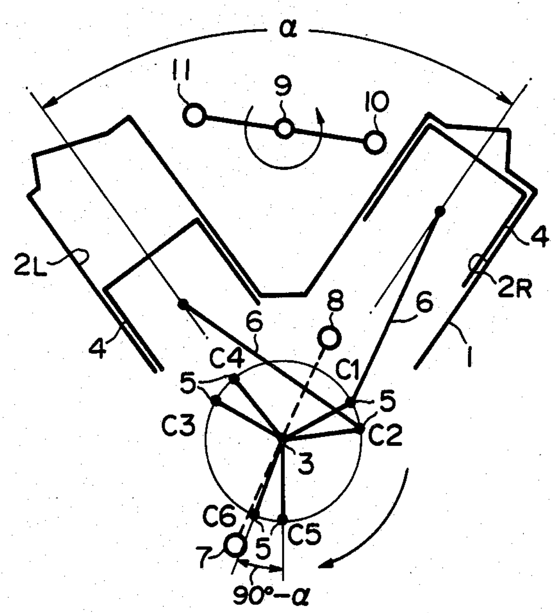
FIG. 8 is a schematic end on diagram, similar to FIG. 1 for the first preferred embodiment, showing the essential components of a V6 engine which is the second preferred embodiment of the present invention.
Figure 9:
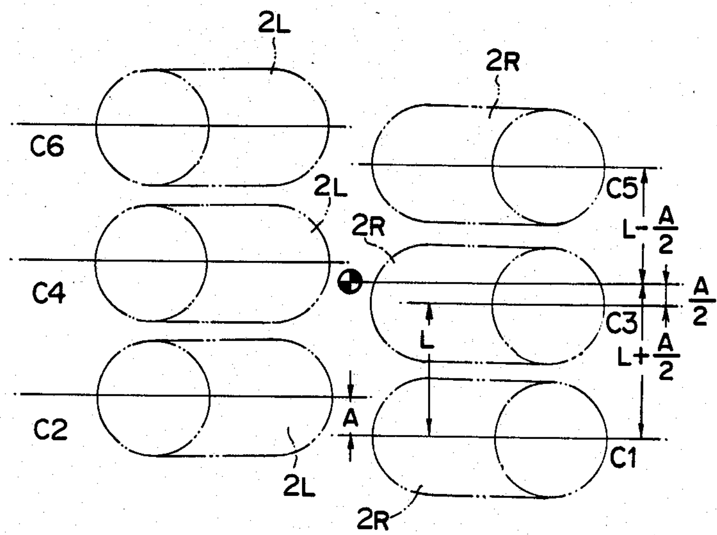
FIG. 9 is a plan view of said essential components of said second preferred embodiment V6 engine.

FIGS. 8 and 9 schematically show a V6 engine which is the second preferred embodiment of the present invention, in a fashion similar to FIGS. 1 and 3 corresponding to the first preferred embodiment respectively. Like parts in this second preferred embodiment are designated in these figures by like numerals to those used for the corresponding parts in FIGS. 1 through 7. The central axes of the three left cylinder bores 2L are coplanar, as are the central axes of the three right cylinder bores 2R; and the plane thus defined by said left cylinder bores 2L and the plane thus defined by said right cylinder bores 2R meet at a bank angle of $\alpha$ which is again not equal to 90°. The cylinder spacing is denoted by L, the offset between the left cylinder bank and the right cylinder bank is denoted by A, and the crank pins for each bank are spaced 120° apart, while the interbank offset is $90° - \alpha$. The firing order for the thus arranged six cylinders is, in order, cylinders 1—6—5—4—3—2, while the firing positions by crank angle are 150°—90°—150°—90°—150°—90°. These firing intervals are the same as those for a normal 90° bank V6.

With this crank pin arrangement and this firing order, as in the case of a V8 engine, the first order and the second order components of the inertia of the rotatory portion of the motion are in balance, but, for the moment due to the inertia of the reciprocating motion, the first and second order crank rotation components do not balance. Of these, the first order imbalance moment is solved, as in the case of the V8 engine described above, by adding balance weights to a member (such as the crank shaft itself) which rotates in the same direction and the same speed as the crank shaft, and to another member (such as the balance shaft 9) which rotates in the opposite direction and at the same speed as the crank shaft. The second order imbalance moment is not removed by these balance weights, but this is also generated as is per se known in a 90° V6 engine, in the same way.

Therefore, it is possible according to the present invention to remove two cylinders from a V8 engine and to produce a V6 engine, thus effecting a notable saving in numbers of parts and so on.

Next, the dynamics of the crank construction and balance for this second preferred embodiment V6 engine will be discussed, with reference to FIGS. 10 through 11, which correspond and are similar to FIGS. 6 and 7 referring to the first preferred embodiment, respectively.

The inertia of the reciprocating motion component for each cylinder is as follows:

$$\text{Inertia of cylinder 1} = \frac{w}{g}\,\alpha\left(\theta - \frac{\alpha}{2}\right)\alpha^{i\frac{\alpha}{2}}$$

$$\text{Inertia of cylinder 2} = \frac{w}{g}\,\alpha\left(\theta - \frac{\alpha}{2} + 90°\right)\alpha^{-i\frac{\alpha}{2}}$$

$$\text{Inertia of cylinder 3} = \frac{w}{g}\,\alpha\left(\theta - \frac{\alpha}{2} - 120°\right)\alpha^{i\frac{\alpha}{2}}$$

$$\text{Inertia of cylinder 4} = \frac{w}{g}\,\alpha\left(\theta - \frac{\alpha}{2} - 30°\right)\alpha^{-i\frac{\alpha}{2}}$$

$$\text{Inertia of cylinder 5} = \frac{w}{g}\,\alpha\left(\theta - \frac{\alpha}{2} + 120°\right)\alpha^{i\frac{\alpha}{2}}$$

$$\text{Inertia of cylinder 6} = \frac{w}{g}\,\alpha\left(\theta - \frac{\alpha}{2} + 150°\right)\alpha^{-i\frac{\alpha}{2}}$$

The resultant $F_6$ of these is obtained by the sum:

$$F_6 = \frac{w}{g}\left(e^{i\frac{\alpha}{2}}\left\{\alpha\left(\theta - \frac{\alpha}{2}\right) + \alpha\left(\theta - \frac{\alpha}{2} - 120°\right) + \alpha\left(\theta - \frac{\alpha}{2} + 120°\right)\right\} + e^{-i\frac{\alpha}{2}}\left\{\alpha\left(\theta - \frac{\alpha}{2} + 90°\right) + \alpha\left(\theta - \frac{\alpha}{2} - 30°\right) + \left(\theta - \frac{\alpha}{2} - 150°\right)\right\}\right) \quad (13)$$

Substitute (5) gives:

$$q_1\colon \cos\left(\theta - \frac{\alpha}{2}\right) + \cos\left(\theta - \frac{\alpha}{2} - 120°\right) + \cos\left(\theta - \frac{\alpha}{2} + 120°\right) \equiv 0$$

$$\cos\left(\theta - \frac{\alpha}{2} + 90°\right) + \cos\left(\theta - \frac{\alpha}{2} - 30°\right) + \cos\left(\theta - \frac{\alpha}{2} - 150°\right) \equiv 0$$

$$p_1\colon \sin\left(\theta - \frac{\alpha}{2}\right) + \sin\left(\theta - \frac{\alpha}{2} - 120°\right) +$$

-continued $$\sin\left(\theta - \frac{\alpha}{2} + 120^\circ\right) \equiv 0$$

$$\sin\left(\theta - \frac{\alpha}{2} + 90^\circ\right) + \sin\left(\theta - \frac{\alpha}{2} - 30^\circ\right) + \sin\left(\theta - \frac{\alpha}{2} - 150^\circ\right) \equiv 0$$

$$q_2: \cos 2\left(\theta - \frac{\alpha}{2}\right) + \cos 2\left(\theta - \frac{\alpha}{2} - 120^\circ\right) + \cos 2\left(\theta - \frac{\alpha}{2} + 120^\circ\right) \equiv 0$$

$$\cos 2\left(\theta - \frac{\alpha}{2} + 90^\circ\right) + \cos 2\left(\theta - \frac{\alpha}{2} - 30^\circ\right) + \cos 2\left(\theta - \frac{\alpha}{2} - 150^\circ\right) \equiv 0$$

$$p_3: \sin 3\left(\theta - \frac{\alpha}{2}\right) + \sin 3\left(\theta - \frac{\alpha}{2} - 120^\circ\right) + \sin 3\left(\theta - \frac{\alpha}{2} + 120^\circ\right) = 3\sin 3\left(\theta - \frac{\alpha}{2}\right)$$

$$\sin 3\left(\theta - \frac{\alpha}{2} + 90^\circ\right) + \sin 3\left(\theta - \frac{\alpha}{2} - 30^\circ\right) + \sin 3\left(\theta - \frac{\alpha}{2} - 150^\circ\right) + 3\sin 3\left(\theta - \frac{\alpha}{2} + 90^\circ\right)$$

Similarly, the fourth and the fifth order items are zero.

$$q_6: \cos 6\left(\theta - \frac{\alpha}{2}\right) + \cos 6\left(\theta - \frac{\alpha}{2} - 120^\circ\right) + \cos 6\left(\theta - \frac{\alpha}{2} + 120^\circ\right) = 3\cos 6\left(\theta - \frac{\alpha}{2}\right)$$

$$\cos 6\left(\theta - \frac{\alpha}{2} + 90^\circ\right) + \cos 6\left(\theta - \frac{\alpha}{2} - 30^\circ\right) + \cos 6\left(\theta - \frac{\alpha}{2} - 150^\circ\right) = 3\cos 6\left(\theta - \frac{\alpha}{2} - 30^\circ\right)$$

From the above expressions, we can show F6 as:

$$F_6 = \frac{w}{g} r\omega^2\left(3p_3\left\{e^{i\frac{\alpha}{2}}\sin 3\left(\theta - \frac{\alpha}{2}\right) + e^{-i\frac{\alpha}{2}}\sin 3\left(\theta - \frac{\alpha}{2} + 90^\circ\right)\right\} + 3q_6\left\{e^{i\frac{\alpha}{2}}\cos 6\left(\theta - \frac{\alpha}{2}\right) + e^{-i\frac{\alpha}{2}}\cos 6\left(\theta - \frac{\alpha}{2} - 30^\circ\right)\right\} + \ldots\right) = \frac{w}{g} r\omega^2\left(3p_3\left\{e^{i\frac{\alpha}{2}}\sin 3\left(\theta - \frac{\alpha}{2}\right) - e^{-i\frac{\alpha}{2}}\cos 3\left(\theta - \frac{\alpha}{2}\right)\right\} + 6iq_6 \sin\frac{\alpha}{2}\cos 6\left(\theta - \frac{\alpha}{2}\right)\right) \quad (14)$$

Next, the moment of inertia $M_6$ of the reciprocating motion component about the engine center is obtained from the sum of inertia for each cylinder multiplied by the distance from the center of that cylinder bore to the center of the engine:

$$M_6 = \frac{W}{g}\left[e^{i\frac{\alpha}{2}}\left\{\alpha\left(\theta - \frac{\alpha}{2}\right)\left(L + \frac{A}{2}\right) + \alpha\left(\theta - \frac{\alpha}{2} - 120^\circ\right)\left(\frac{A}{2}\right) - \alpha\left(\theta - \frac{\alpha}{2} + 120^\circ\right)\left(L - \frac{A}{2}\right)\right\} + e^{-i\frac{\alpha}{2}}\left\{\alpha\left(\theta - \frac{\alpha}{2} + 90^\circ\right)\left(L - \frac{A}{2}\right) - \alpha\left(\theta - \frac{\alpha}{2} - 30^\circ\right)\left(\frac{A}{2}\right) - \alpha\left(\theta - \frac{\alpha}{2} - 150^\circ\right)\left(L + \frac{A}{2}\right)\right\}\right] \quad (15)$$

Substituting (5) in (15), and simplifying:

$$M_6 = \frac{W}{g} r\omega^2\left[q_1 L e^{i\frac{1}{2}}\left\{\cos\left(\theta - \frac{\alpha}{2}\right) - \cos\left(\theta - \frac{\alpha}{2} + 120^\circ\right)\right\} + q_1 L e^{-i\frac{\alpha}{2}}\left\{\cos\left(\theta - \frac{\alpha}{2} + 90^\circ\right) - \cos\left(\theta - \frac{\alpha}{2} - 150^\circ\right)\right\} + \right. \quad (16)$$

-continued $$p_1 L e^{i\frac{\alpha}{2}}\left\{\sin\left(\theta-\frac{\alpha}{2}\right)-\sin\left(\theta-\frac{\alpha}{2}+120^\circ\right)\right\}+$$

$$p_1 L e^{-i\frac{\alpha}{2}}\left\{\sin\left(\theta-\frac{\alpha}{2}+90^\circ\right)-\sin\left(\theta-\frac{\alpha}{2}-150^\circ\right)\right\}+$$

$$2iq_2 L\sin\frac{\alpha}{2}\cos 2\left(\theta-\frac{\alpha}{2}\right)+$$

$$\frac{3A}{2}p_3\left\{e^{i\frac{\alpha}{2}}\sin 3\left(\theta-\frac{\alpha}{2}\right)-e^{-i\frac{\alpha}{2}}\sin\left\{3\left(\theta-\frac{\alpha}{2}\right)-90^\circ\right\}+\right.$$

$$\left.2\sqrt{3}\,q_4 L\cos\frac{\alpha}{2}\left\{4\left(\theta-\frac{\alpha}{2}\right)-30^\circ\right\}\ldots\right]$$

In the moment M6, only the first term of (16) is a problem. This may be rewritten as:

$$\frac{W}{g}r\omega_2\left[\sqrt{3}\,q_1 L\left\{e^{i\frac{\alpha}{2}}\cos\left(\theta-\frac{\alpha}{2}-30^\circ\right)+e^{-i\frac{\alpha}{2}}\cos\left(\theta-\frac{\alpha}{2}+60^\circ\right)\right\}+\sqrt{3}\,p_1 L\left\{e^{-i\frac{\alpha}{2}}\sin\left(\theta-\frac{\alpha}{2}-30^\circ\right)+e^{-i\frac{\alpha}{2}}\sin\left(\theta-\frac{\alpha}{2}+60^\circ\right)\right\}\right]= \tag{17}$$

$$\frac{W}{g}r\omega_2\cdot\frac{\sqrt{3}}{4}L[e^{i\theta}(q_1-ip_1)(\sqrt{3}-i)(1+ie^{-i\alpha})+e^{-i\theta}(q_1+ip_1)(1-\sqrt{3}\,i)(1+ie^{i\alpha})]$$

In (17), $e^{i\theta}$ is the rotary velocity vector in the same direction as the crank shaft rotation, and is equal to the crank shaft rotary velocity; $e^{-i\theta}$ is the same magnitude rotation in the opposite direction.

So, by adding balance weights of weight and phase determined by the expression below to the crankshaft or to a member rotating in the same direction with the same rotational speed, the items involving $e^{i\theta}$ in (17) an be made zero.

$$-\frac{W}{g}r\cdot\frac{\sqrt{3}}{4}L(q_1-ip_1)(\sqrt{3}-i)(1+ie^{-i\alpha}) \tag{18}$$

Then, by adding balance weights of weight and phase determined by the expression below to a member rotating in the opposite direction and at the same rotational speed as the crankshaft (for example, to the balance shaft 9), the items involving $e^{-i\theta}$ in (17) can be made zero.

$$-\frac{W}{g}r\cdot\frac{\sqrt{3}}{4}L(q_1+ip_1)(1-\sqrt{3}\,i)(1+ie^{i\alpha})$$

The second order imbalance moment in (16) is not eliminated, but even in a 90° V6 engine with three crank throws the second order remains:

$$-(w/g)r\omega^{2}\cdot\sqrt{6}\,iLq_2\cos(2\theta+120^\circ)$$

and this is the same as for a 90° V6.

Figure 10:
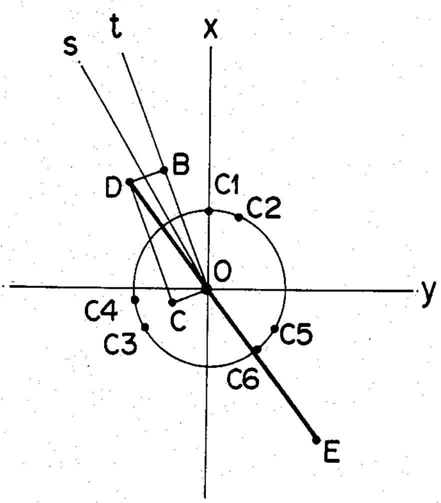
FIG. 10, like FIG. 6 for the first preferred embodiment, schematically shows the size and phase of the balance weights on the crank shaft in this second preferred embodiment.

FIG. 10 shows the size and phase of the balance weights on the crank shaft 3, and:

$$\angle XOS=\tan^{-1}\frac{1}{\sqrt{3}},\ \angle SOt=\frac{90^\circ-\alpha}{2},$$

$$\angle uOt=90^\circ,\ \overline{BO}=q_1,\ \overline{CO}=p_1,$$

$$\overline{OE}=\frac{W}{g}r\frac{\sqrt{3}}{4}L|(q_1-ip_1)(\sqrt{3}-i)(1+ie^{-i\alpha})|=\frac{W}{g}rL\sqrt{15(1+\sin\alpha)(q_2^2+p_1^2)}\,/2$$

Figure 11:
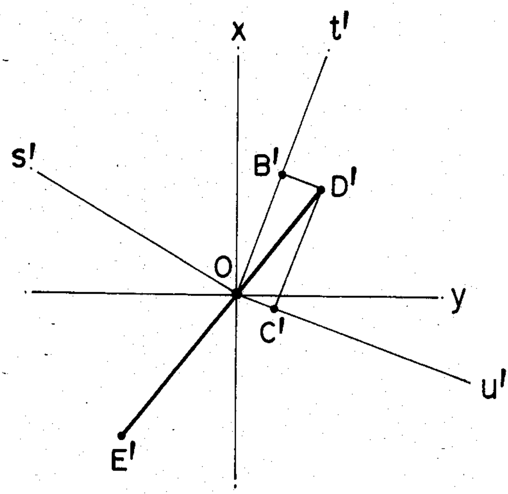
FIG. 11, like FIG. 7 for the first preferred embodiment, similarly shows the size and phase of the balance weights on the balance shaft in this second preferred embodiment.

FIG. 11 shows the same for the balance shaft 9, and:

$$\angle XOS'=\tan^{-1}\sqrt{3},\ \angle S'Ot'=\frac{90^\circ+\alpha}{2},\ \angle u'Ot'=90^\circ,\ \overline{B'O}=q_1,\ \overline{CO}=p_1,$$

$$\overline{OE'}=\frac{W}{g}r\cdot\frac{\sqrt{3}}{4}L|(q_1+ip_i)(1-\sqrt{3}\,i)(1+ie^{i\alpha})|=\frac{W}{g}rL\sqrt{15(1-\sin\alpha)(q_1^2+p_1^2)}\,/2$$

Thus it is seen that, according to the above outlined structure, the previously described problems with respect to the prior art can be overcome simply and economically, and in the shown and described four stroke V configuration engine according to the present invention the bank angle can be arbitrarily chosen as desired and particularly can be greater or less than 90° in the case of an eight or six cylinder engine; and this engine can be substantially free from vibration problems, because it has good compensation and balance of the reciprocating and rotating moments. Thus, this four stroke V configuration engine according to the present invention has excellent mounting convenience, and is compact and particularly is reduced in width when $\alpha<90^\circ$ as compared to conventional art.

Although the present invention has been shown and described with reference to the preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown preferred embodiments, or of the drawings, but solely by the scope of the appended claims, which follow.

What is claimed is:

1. A four stroke V configuration engine comprising:

first and second cylinder banks arranged in a V configuration and angled with respect to one another at a bank angle $\alpha$;

a plurality of pairs of cylinders, each said pair of cylinders comprising a cylinder of said first cylinder bank, and a cylinder of said second cylinder bank angled with respect to said cylinder of said first cylinder bank at a bank angle $\alpha$;

a crank shaft having opposed axial ends and formed with a plurality of pairs of crank pins, each said pair of crank pins comprising a first crank pin for a cylinder of said first cylinder bank, and a second crank pin for a cylinder of said second cylinder bank, said first and second crank pins of each said pair of crank pins being angled with respect to one another at a crank angle equal to $90°-\alpha$;

a pair of camshafts arranged in parallel with said crankshaft, and including a first camshaft for said first cylinder bank, and a second camshaft for said second cylinder bank;

a balance shaft arranged in parallel with said crank shaft and said camshafts;

a first set of balance weights fixed to said crank shaft adjacent the opposed axial ends of said crank shaft;

a second set of balance weights fixed to said balance shaft;

a first sprocket wheel non-rotatably mounted on said crankshaft;

a second sprocket wheel non-rotatably mounted on said balance shaft, said second sprocket wheel having a diameter equal to the diameter of said first sprocket wheel;

a third sprocket wheel non-rotatably mounted on said first camshaft, said third sprocket wheel having a diameter which is twice as large as the diameter of said first sprocket wheel;

a fourth sprocket wheel non-rotatably mounted on said second camshaft, said fourth sprocket wheel having a diameter which is twice as large as the diameter of said first sprocket wheel;

and an endless chain engaging said first, second, third and fourth sprocket wheels such that the balance shaft and the crank shaft rotate in opposite directions at the same speed and the first and second camshafts rotate in the same direction as the crank shaft at one-half the speed of the crank shaft;

wherein the weights of said first and second set of balance weights and the position of the weights of said first and second set of balance weights relative to said crank shaft and said balance shaft respectively, are selected so as to cancel out first order unbalance moments of reciprocating and rotational motions in said engine.

2. An engine according to claim 1, wherein as viewed in a plane which is perpendicular to the longitudinal axes of said crank shaft, said pair of camshafts and said balance shaft, said crank shaft is at the apex of a triangle having a base defined between said first and second camshafts, and said balance shaft is located inside of said triangle.

3. An engine according to claim 2, wherein said triangle is a substantially equilateral triangle, and said balance shaft is substantially located on a bisector of said substantially equilateral triangle which passes through said apex.

* * * * *